US012708587B1

(12) United States Patent
Cun et al.

(10) Patent No.: US 12,708,587 B1
(45) Date of Patent: Aug. 18, 2026

(54) SHAPABLE TUBULAR DEVICE

(71) Applicant: SHENZHEN ENVISION TECHNOLOGY INNOVATION CO., LTD., Shenzhen (CN)

(72) Inventors: Lang Cun, Shenzhen (CN); Yiwei Lin, Chengdu (CN)

(73) Assignee: SHENZHEN ENVISION TECHNOLOGY INNOVATION CO., LTD., Shenzhen (CN)

( * ) Notice: Subject to any disclaimer, the term of this patent is extended or adjusted under 35 U.S.C. 154(b) by 0 days.

(21) Appl. No.: 19/327,194

(22) Filed: Sep. 12, 2025

(30) Foreign Application Priority Data

Sep. 1, 2025 (CN) ........................ 202521884380.X

(51) Int. Cl.
*A61H 19/00* (2006.01)
*A61H 23/02* (2006.01)

(52) U.S. Cl.
CPC ............. *A61H 19/32* (2013.01); *A61H 23/02* (2013.01)

(58) Field of Classification Search
CPC ........ A61H 19/00; A61H 19/30; A61H 19/32; A61H 19/34; A61H 19/40; A61H 19/44; A61H 19/50; A61H 21/00; A61H 23/00; A61H 23/004; A61H 23/02; A61H 23/0254; A61H 23/0263; A61H 2023/0272; A61H 2023/0281
See application file for complete search history.

(56) References Cited

U.S. PATENT DOCUMENTS

| | | | | |
|---|---|---|---|---|
| 8,622,890 B1 * | 1/2014 | Caggiano | A61H 19/50 | 600/38 |
| 12,036,173 B1 * | 7/2024 | He | A61H 23/0263 | |
| 2007/0142754 A1 * | 6/2007 | Nan | A61H 19/44 | 601/72 |
| 2011/0034763 A1 * | 2/2011 | Domnick | A61H 19/44 | 600/38 |
| 2018/0185237 A1 * | 7/2018 | Baetica | G08C 17/02 | |
| 2020/0085674 A1 * | 3/2020 | Haddock | A61H 21/00 | |

* cited by examiner

*Primary Examiner* — Carrie R Dorna
(74) *Attorney, Agent, or Firm* — HOWARD M COHN and Associates, LLC

(57) ABSTRACT

A shapable tubular device configured to transfer mechanical energy and applied to a male primate is provided. The shapable tubular device includes an elongated silicone tube, shapable keels disposed therein, and vibration units disposed inside the elongated silicone tube along an extension direction thereof. The elongated silicone tube is closed at two ends thereof. A portion of an outer surface of the elongated silicone tube is at least configured to transfer the mechanical energy of the shapable tubular device to an external object. The shapable keels are configured to deform the elongated silicone tube during operation, so that a portion of the outer surface of the elongated silicone tube is adapted to a contour of the external object. The vibration units are configured to transmit the mechanical energy generated during operation to the elongated silicone tube from inside to outside.

17 Claims, 9 Drawing Sheets

SHAPABLE TUBULAR DEVICE

TECHNICAL FIELD

The present disclosure relates to a technical field of physiotherapy equipment, and in particular to a massager applied on an outer surface on male primates (mainly adult males). The massager is configured to transfer mechanical energy generated by the massager to an external object.

BACKGROUND

With technological advancements and rising living standards, adult massagers have become a popular everyday item. Among adult massagers, penis massagers that are specifically designed for male sexual health have positive effects on overcoming male sexual dysfunction, improving sexual health, and fostering harmonious relationships. Conventional penis massagers have many shortcomings.

Generally, vibration units (vibration motors) thereof are rigidly connected in series, which results in a massager body thereof easily resetting after bending and failing to adapt to a curvature of an external object (specifically the penis).

Conventional support keels thereof generally have poor stability after deformation and are unable to maintain a structure shaped by a user. As a result, when a silicone tube where the support keels are mounted is spirally wound around the penis (which is generally cylindrical), the silicone tube does not fit the penis well.

A base ring thereof (commonly known as a lock ring) disposed on an end of the silicone tube has a sudden change in curvature where it connects to a main body of the silicone tube, which easily causes localized pressure and discomfort to the user.

SUMMARY

In view of shortcomings of the prior art, the present disclosure provides a shapable tubular device suitable for adult male physiological health care. The shapable tubular device is able to transfer mechanical energy, has a good fit with the penis, and is able to meet comfort requirements of adult men.

The present disclosure provides a shapable tubular device configured to transfer mechanical energy and applied to a male primate.

The shapable tubular device comprises an elongated silicone tube, shapable keels disposed inside the elongated silicone tube along an extension direction of the elongated silicone tube, and vibration units disposed inside the elongated silicone tube along the extension direction of the elongated silicone tube.

The elongated silicone tube is closed at two ends thereof. A portion of an outer surface of the elongated silicone tube is at least configured to transfer the mechanical energy of the shapable tubular device to an external object. The shapable keels are configured to deform the elongated silicone tube during operation, so that a portion of the outer surface of the elongated silicone tube is adapted to a contour of the external object. The vibration units are configured to transmit the mechanical energy generated during operation to the elongated silicone tube from inside to outside.

Optionally, a tail portion of the elongated silicone tube is coiled into a base ring, and the base ring is configured to be sleeved on a root of an external object. The base ring is configured to prevent the external object from prematurely producing a normal biological morphological reaction due to a mechanical action of the shapable tubular device.

Optionally, the elongated silicone tube comprises an extension section extending from the tail portion thereof to a head portion thereof. A thoracico-abdominal outer surface of the extension section is longitudinally contractible and bent. A spinal outer surface of the extension section is longitudinally expandable and bent. The extension section is able to be spirally wound on the external object.

A center line of the extension section is substantially coincident with a center line of the base ring, so that the thoracico-abdominal outer surface of the extension section is in an approximate cylindrical shape to adapt to the external object. The thoracico-abdominal outer surface of the extension section is configured to transfer the mechanical energy to a cylindrical surface of the external object.

Optionally, a transition section is connected between the base ring and the extension section extending toward the head portion of the elongated silicone tube. Shapes and sizes of cross sections of the transition section gradually change.

Optionally, the cross sections of the transition section comprise a circular cross section connected to the base ring and a flat ring-shaped cross section connected to the extension section.

Optionally, the shapable keels and the vibration units are alternately disposed along the extension direction of the elongated silicone tube to improve an overall shapeability of the elongated silicone tube and ensure uniformity of vibration distribution.

Optionally, positioning grooves configured to accommodate the vibration units are defined on an inner wall of the elongated silicone tube. The positioning grooves are configured to prevent the vibration units from moving and prevent the vibration units from longitudinally squeezing the shapable keels.

Optionally, a deformation space is defined between outer walls of the shapable keels and the inner wall of the elongated silicone tube. The deformation space allows the shapable tubular device to be in a working state or in a storage state.

Optionally, a vibration motor is disposed in the head portion of the elongated silicone tube and is corresponding to a lower jaw on the thoracico-abdominal outer surface of the extension section. The vibration motor is configured to transfer the mechanical energy to a top portion of the external object.

Optionally, a control system of the vibration units is accommodated in a rigid skull. The rigid skull is disposed inside the head portion of the elongated silicone tube. A retractable neck of the rigid skull is connected to a head end of a top shapable keel of the shapable keels.

Optionally, an operating surface of the control system is disposed on the head portion of the elongated silicone tube and is corresponding to an upper jaw of the spinal outer surface of the extension section of the elongated silicone tube. The operating surface of the control system is configured for a user to operate.

Optionally, a connecting line connecting the control system and the vibration units passes through inner cores of the shapable keels.

Optionally, two ends of each of the vibration units distributed along a center line of each of the vibration units are respectively a square end and a circular end.

Optionally, the vibration units and the shapable keels are connected through sleeve structures.

Optionally, each of the sleeve structures comprises a square tube joint and a circular tube joint. Each square tube joint is connected to a corresponding one of the shapable keels and the square end of a corresponding one of the vibration units. Each circular tube joint is connected to a corresponding one of the shapable keels and the circular end of a corresponding one of the vibration units.

Optionally, each square tube joint comprises a square end sleeve and a keel tail sleeve coaxially disposed with the square end sleeve. Each square end sleeve comprises two parallel inner surfaces and two arc-shaped inner surfaces. The two arc-shaped inner surfaces thereof protrude outwards and are configured to separate the two parallel inner surfaces thereof.

The two parallel inner surfaces of each square end sleeve are configured to match with two parallel outer surfaces of the square end of a corresponding one of the vibration units. The two arc-shaped inner surfaces of each square end sleeve are configured to match with two arc-shaped outer surfaces of the square end of the corresponding one of the vibration units.

Each keel tail sleeve is sleeved on a tail end of a corresponding one of the shapable keels.

Optionally, each circular tube joint comprises a circular end sleeve and a keel head sleeve coaxially disposed with the circular end sleeve. Each circular end sleeve is connected to the round end of a corresponding one of the vibration units, and each keel head sleeve is sleeved on a head end of a corresponding one of the shapable keels.

Optionally, a T-shaped joint is disposed between the rigid skull and the top shapable keel. The connecting line connecting the control system and the vibration units is partially disposed inside the T-shaped joint.

Optionally, a tail end of a vertical sleeve of the T-shaped joint is sleeved with the head end of the top shapable keel. A cross-shaped end of the T-shaped joint is mounted inside the retractable neck of the rigid skull. Cross-shaped end of the T-shaped joint comprises horizontal plugs.

Optionally, through holes are defined on two sides of the retractable neck, and the through holes are coaxially disposed. The shapable tubular device further comprises screws. Each of the screws passes through a corresponding one of the through holes to screw with a corresponding one of the horizontal plugs, so that the rigid skull is fixed to the T-shaped joint.

The shapable tubular device comprises the elongated silicone tube with closed ends, the vibration units spaced apart along the extension direction thereof, and coupling structures of the shapable keels and the vibration units. Such arrangement ensures high mechanical energy transmission efficiency within the shapable tubular device.

The shapable keels offer excellent dynamic morphological adaptability. The shapable keels support and shape the elongated silicone tube. During use, the shapable keels deform spirally, allowing portions of the outer surface of the elongated silicone tube to adapt to the outer contour of the external object.

The shapable tubular device optimizes ergonomics. The base ring is disposed on the tail portion of the elongated silicone tube. The transition section connects the base ring to the extension section extending toward the head portion of the elongated silicone tube. The shapes and the sizes of the cross sections of the transition section gradually change. The user is able to spirally wrap the elongated silicone tube around the external object (the penis). The center line of the extension section essentially aligns with the center line of the base ring, allowing the outer surface of the elongated silicone tube to better adapt to the external object (which is approximately cylindrical), thereby meeting comfort requirements of the user.

The present disclosure achieves a technological breakthrough in male physiological health massagers through a center line control of the shapable keels, energy transmission on the portion of the outer surface of the elongated silicone tube with two closed ends, and a transition section that is ergonomic.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

Figure 1:
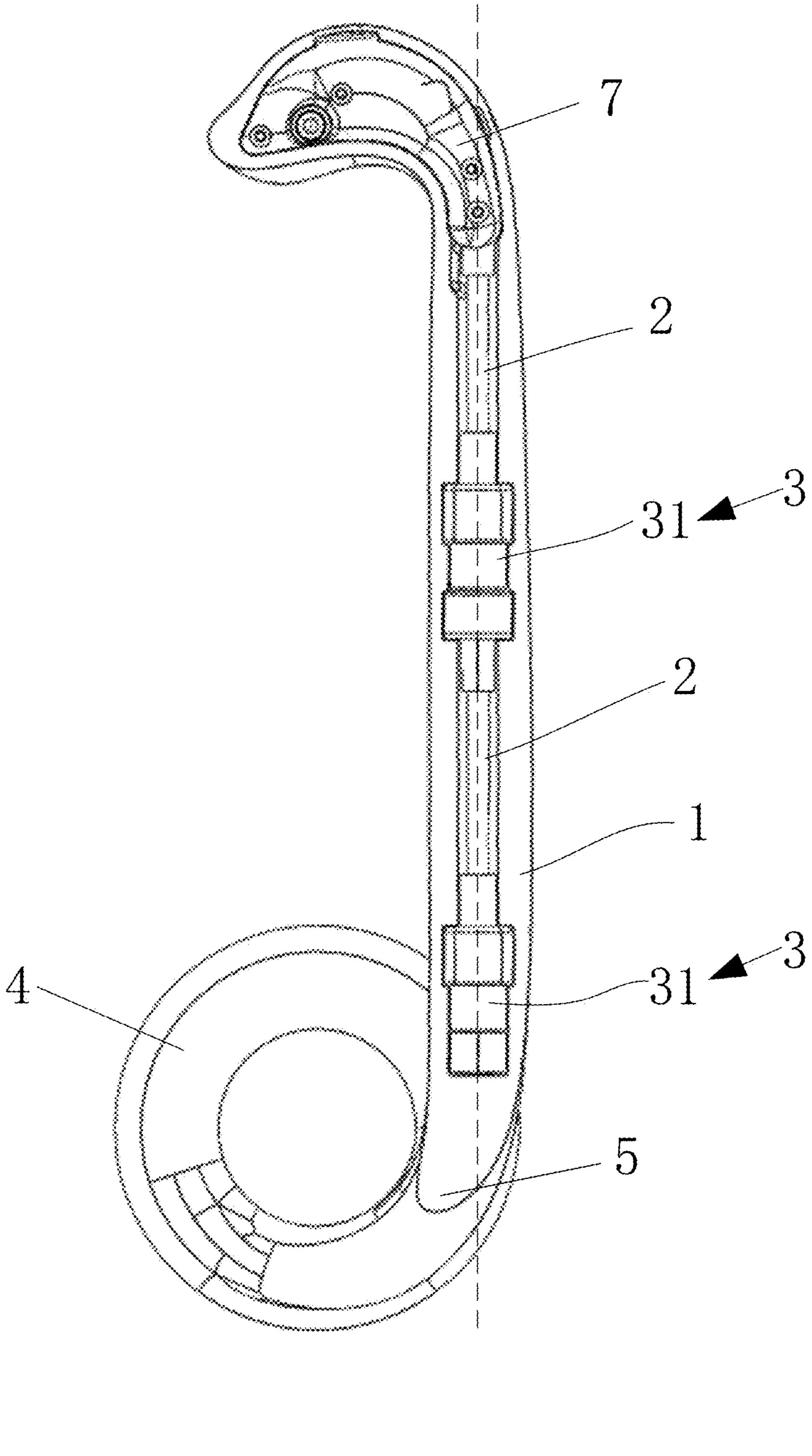
FIG. 1 is a cross-sectional schematic diagram of a shapable tubular device according to a first embodiment of the present disclosure.

In the drawings: elongated silicone tube 1; positioning groove 11; deformation space 12; operating surface 13; thoracico-abdominal outer surface 14; shapeable keel 2; vibration unit 3; second micro-vibration motor 30; first micro-vibration motor 31; square end 31*a*; circular end 31*b*; base ring 4; transition section 5; control system 6; power supply 61; control board 62; frequency and amplitude modulation button 63; contact surface 63*a*; rigid skull 7; through hole 71; retractable neck 72; connecting line 8; sleeve structure 9; square tube joint 91; square end sleeve 91*a*; keel tail sleeve 91*b*; circular tube joint 92; circular end sleeve 92*a*; keel head sleeve 92*b*; T-shaped joint 10; vertical sleeve 10*a*; horizontal plug 10*b*; micro-vibration device 100; flexible connector 200; bead 300; flexible line 400.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Embodiment 1

Figure 2:
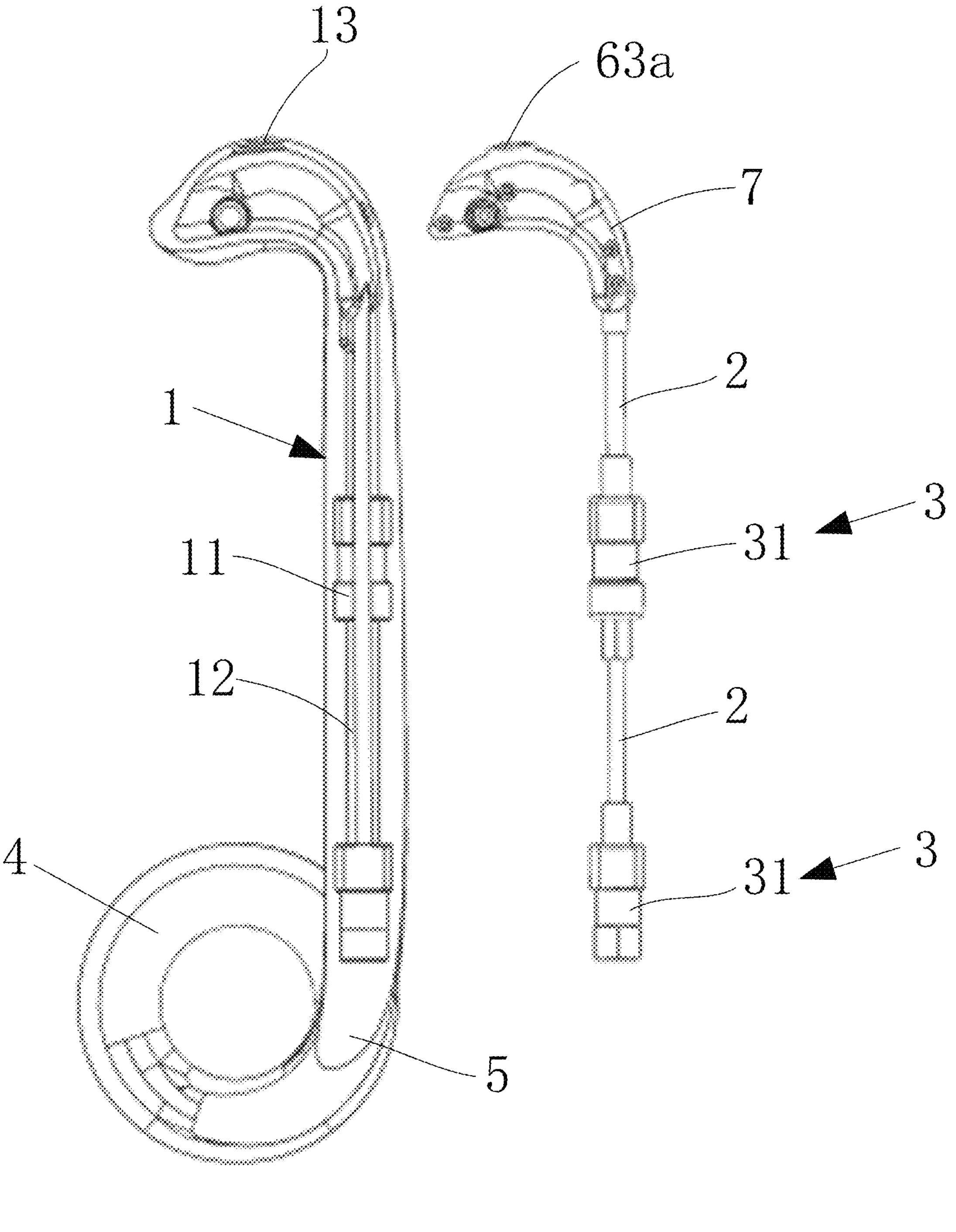
FIG. 2 is an exploded schematic diagram of the shapable tubular device according to the first embodiment of the present disclosure.
Figure 3:
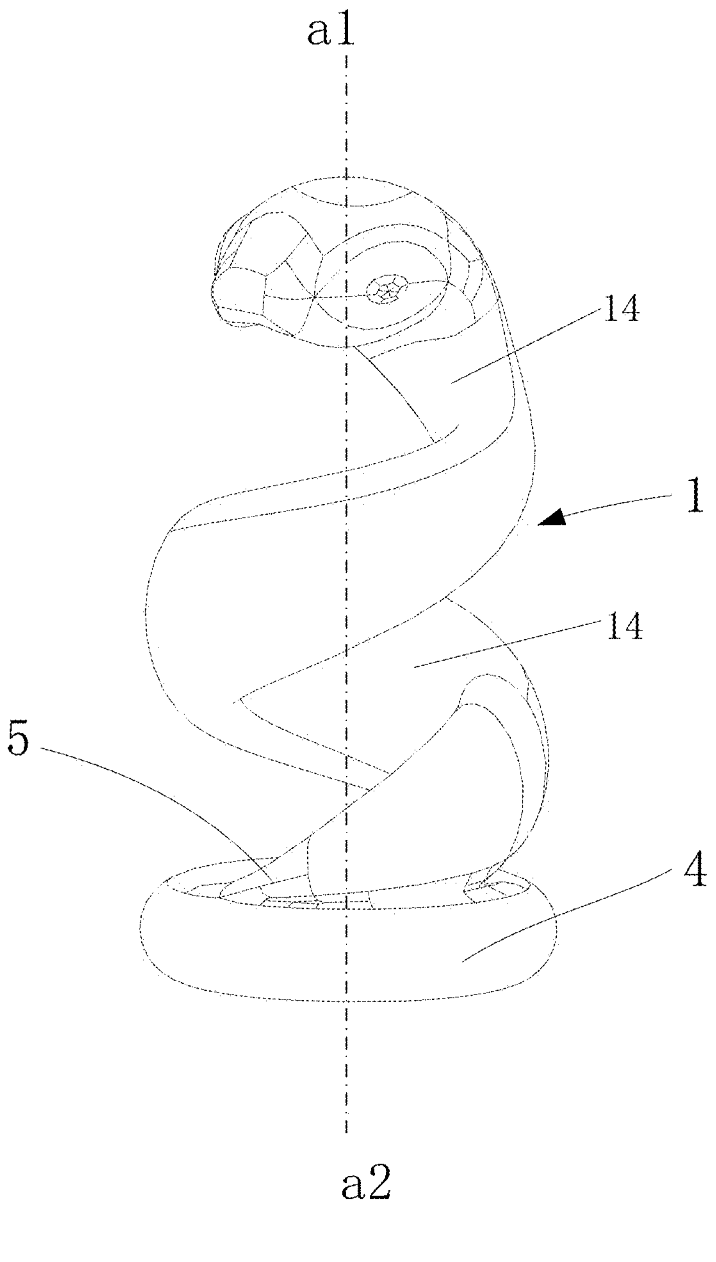
FIG. 3 is a schematic diagram of the shapable tubular device in a spiral shape according to the first embodiment of the present disclosure.
Figure 4:
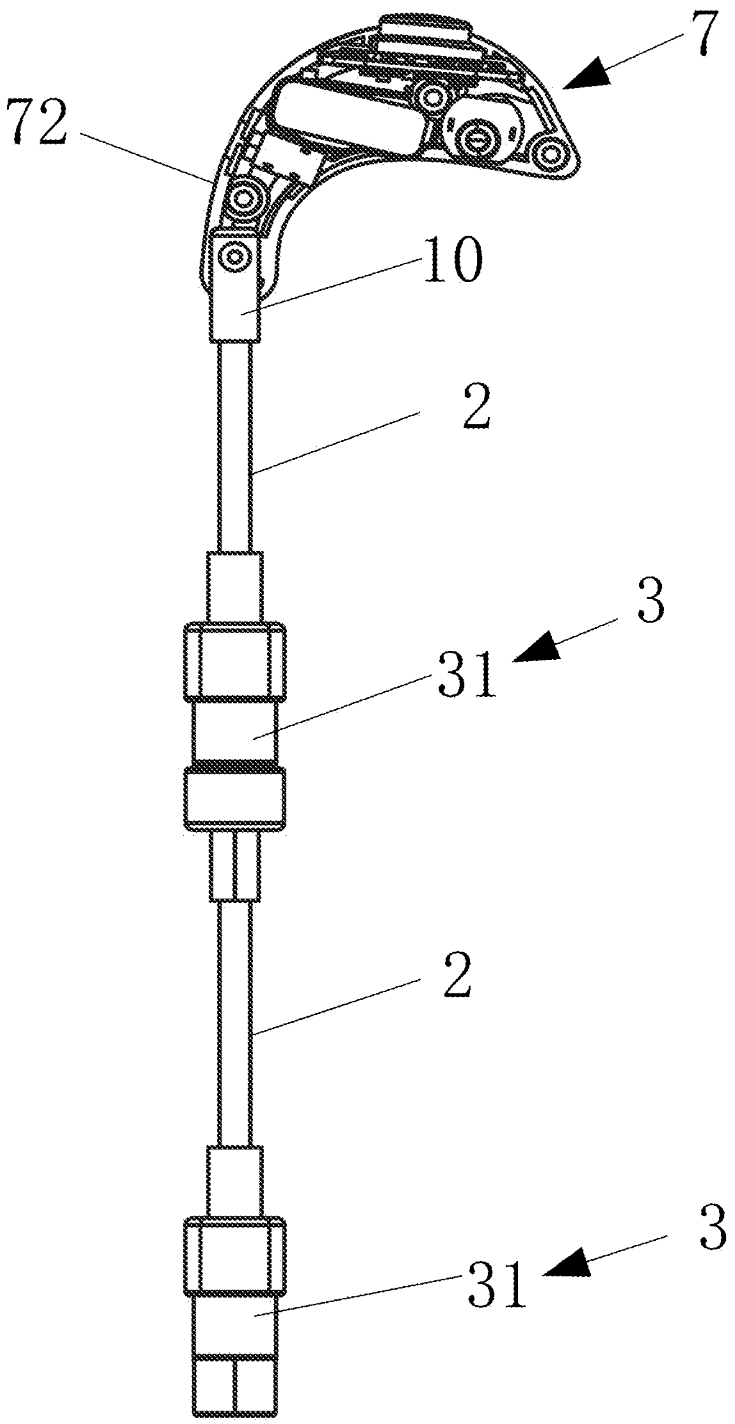
FIG. 4 is a schematic diagram of shapable keels, vibration units, and a rigid skull of the shapable tubular device according to the first embodiment of the present disclosure.

As shown in FIGS. 1, 2, and 3, the present disclosure provides a shapable tubular device suitable for transferring mechanical energy to the body of a primate and suitable for male primate physiological health care. Specifically, the shapable tubular device is suitable for adult male physiological health care. The shapable tubular device is designed to resemble a cartoon animal consistent with usage customs. For instance, a shape of the shapable tubular device resembles a snake.

The shapable tubular device comprises an elongated silicone tube 1, shapable keels 2 and vibration units 3. The elongated silicone tube 1 is closed at two ends thereof. A portion of an outer surface of the elongated silicone tube 1 is at least configured to transfer the mechanical energy of the shapable tubular device to an external object (i.e, the penis).

The elongated silicone tube 1 is made of a non-toxic, environmentally friendly, medical-grade flexible silicone material. A main portion (i.e., the extension section) of the elongated silicone tube 2 has cross sections that are flat ring-shaped, annular, circular, or elliptical. Optionally, the cross sections of the main portion of the elongated silicone tube 2 are flat ring-shaped. During use, the main portion is spirally wrapped around the external object. A thoracico-abdominal outer surface 14 of the elongated silicone tube 1 is well attached to a surface of the external object (i.e., the penis which is approximately cylindrical).

The shapable keels 2 are disposed inside the elongated silicone tube 1 along a length direction of the elongated silicone tube 1. The shapable keels 2 have a shapable property. The shapable keels 2 are configured to maintain a center line of the elongated silicone tube 1. When in use, the shapable keels are deformed, so that the thoracico-abdominal outer surface 14 of the elongated silicone tube 1 fits the contour of the external object. Specifically, the shapable keels 2 are disposed inside the elongated silicone tube 1 along the length direction. The shapable keels 2 have the characteristics of plastic deformation and maintaining a deformed state at room temperature. The main function of the shapable keel 2 is to define the center line of the elongated silicone tube 1 when the elongated silicone tube 1 is bent and deformed, so that the shapable tubular device maintains morphological stability when it is spirally wound around the external object.

When the shapable tubular device is in use, the main portion of the elongated silicone tube 1 is spirally wound around the external object, and the shapable keels 2 disposed along the length direction of the elongated silicone tube 1 maintain the stability of a spiral structure of the elongated silicone tube 1.

The shapable keels 2 have the characteristics of plastic deformation and maintaining the deformed state, which achieve a shape control of the elongated silicone tube 1. The shapable keels 2 may be metallic braided tubes, non-metallic braided tubes, composite material braided tubes, or non-braided tube structures, as long as the shapable keels 2 are able to achieve plastic deformation and maintain a deformed shape at room temperature. Optionally, each of the shapable keels 2 is composite structures of nickel-titanium shape memory alloy wire and a thermoplastic polyurethane coating.

The vibration units 3 are disposed inside the elongated silicone tube 1 along the axial direction of the elongated silicone tube 1. Optionally, the vibration units 3 are first micro-vibration motors 31. When the first micro-vibration motors 31 are in operation, mechanical vibration energy generated by the first micro-vibration motors 3 is transmitted through the following path: from each of the first micro-vibration motors 31, to a silicone tube wall of the elongated silicone tube 1, and to the thoracico-abdominal outer surface 14 of the elongated silicone tube 1. Finally, the mechanical vibration energy is transmitted to the external object through the thoracico-abdominal outer surface 14 of the elongated silicone tube 1.

Optionally, positioning grooves 11 configured to accommodate the first micro-vibration motors 31 are defined on an inner wall of the elongated silicone tube 1. Specifically, the positioning grooves 11 are rectangular grooves surrounding the inner wall of the elongated silicone tube 1. The positioning grooves 11 are matched with the first micro-vibration motors 31 and are configured to prevent the first micro-vibration motors 31 from moving and prevent the first micro-vibration motors 31 from longitudinally squeezing the shapable keels 2. Optionally, a deformation space 12 is defined between outer walls of the shapable keels 2 and the inner wall of the elongated silicone tube 1. The deformation space 12 allows the shapable tubular device to be in a working state or in a storage state.

The shapable keels 2 and the vibration unit are alternately disposed along the extension direction of the elongated silicone tube 1 to improve the overall shapeability of the elongated silicone tube 1 and ensure uniformity of vibration distribution.

A tail portion of the elongated silicone tube 1 is coiled into a base ring 4 (also known as a lock ring), and the base ring 4 is configured to be sleeved on a root of an external object. The base ring 4 is configured to prevent the external object from prematurely producing a normal biological morphological reaction due to the mechanical action of the shapable tubular device.

In the embodiment, a transition section 5 is connected between the base ring 4 and the extension section extending toward the head portion of the elongated silicone tube 1. The transition section 5 prevents a sudden change in curvature where the base ring connects to the main portion of the elongated silicone tube 1, thereby avoiding bringing localized pressure and discomfort to the user. Shapes and sizes of cross sections of the transition section 5 gradually change.

The cross sections of the transition section 5 exhibit a continuous gradient: A cross section of a first end of the transition section 5 connected to the base ring 4 is circular. The transition section 5 then gradually transitions, and a cross section of a second end of the transition section 5 connected to the extension section is flat ring-shaped. The base ring 4, the transition section 5, and the extension section are manufactured by an integral injection molding process to form the elongated silicone tube 1, thereby ensuring structural continuity and material consistency.

As shown in FIG. 3, the elongated silicone tube 1 comprises the extension section extending from the tail portion thereof to a head portion thereof. A thoracico-abdominal outer surface 14 of the extension section is longitudinally contractible and bent. A spinal outer surface of the extension section is longitudinally expandable and bent. The extension section is able to spirally wound on the external object (not shown in the drawings). A center line (a1-a2) of the extension section is substantially coincident with a center line of the base ring 4, so that thoracico-abdominal outer surface 14 of the extension section is in an approximate cylindrical shape to adapt to the external object. The thoracico-abdominal outer surface 14 of the extension section is configured to transfer the mechanical energy to a cylindrical surface of the external object.

Figure 6:
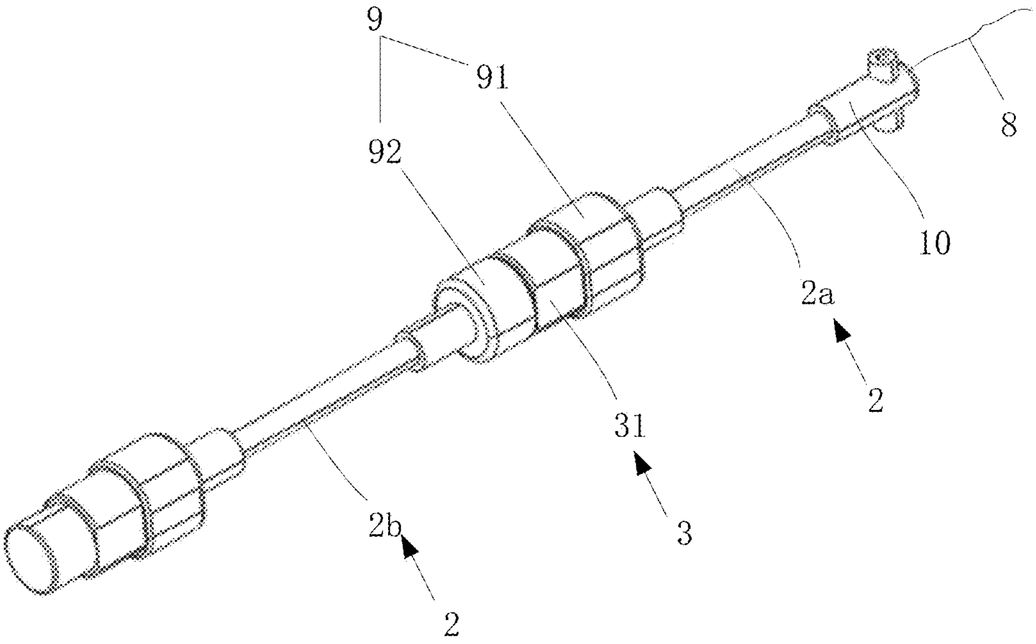
FIG. 6 is a schematic diagram of the shapable keels connected to the vibration units, of the shapable tubular device according to the first embodiment of the present disclosure.
Figure 7:
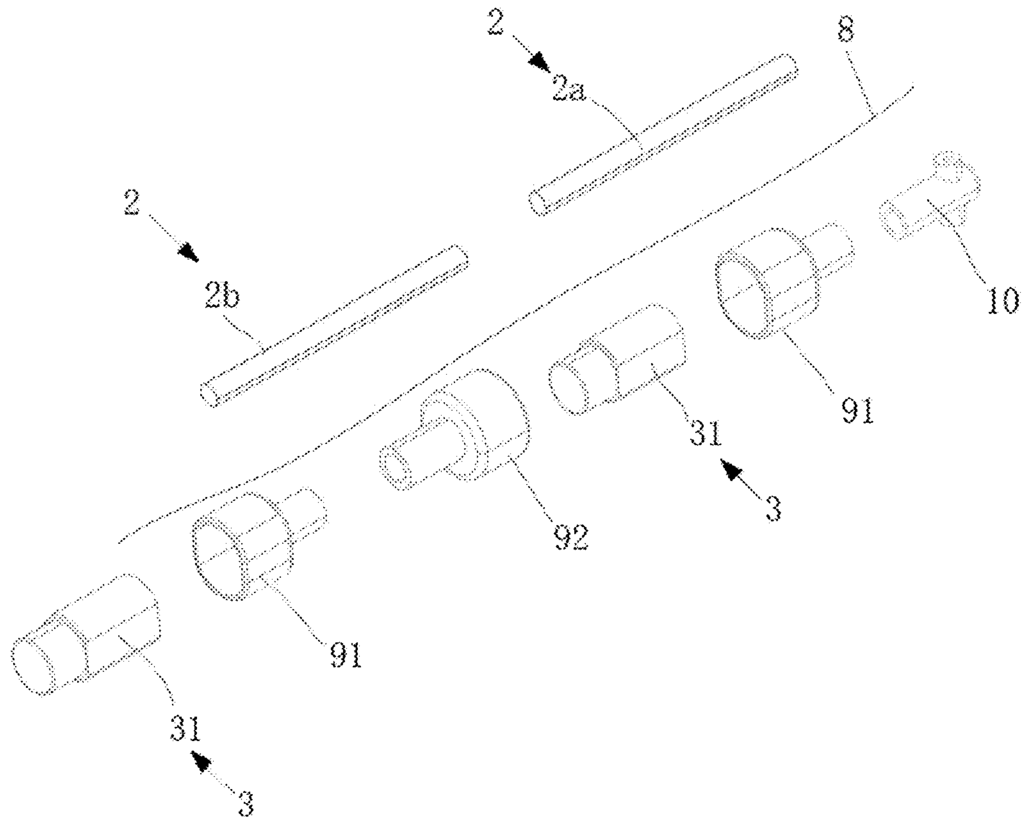
FIG. 7 is an exploded schematic diagram of structures shown in FIG. 6.

As shown in FIGS. 1, 4, 6, and 7, the shapable keels 2 and the first micro-vibration motors 31 are alternately disposed along the axial direction of the elongated silicone tube 1, thereby ensuring the flexible adaptability of the shapable tubular device through the plastic deformation ability of the shapable keels 2. Meanwhile, spatially uniform transmission of the mechanical vibration energy is achieved through a regular distribution of the first micro-vibration motors 31. Optionally, as shown in FIGS. 6 and 7, there are two shapable keels 2, including a first shapable keel 2*a* and a second shapable keel 2*b*, and there are two first micro-vibration motors 31. The two shapable keels 2 and the two first micro-vibration motors 31 are disposed at intervals and are alternately disposed.

It should be noted that a length of the second shapable keel 2*b* disposed between the two first micro-vibration motors 31 determines a distance between the two first micro-vibration motors 31. In other words, a spacing between the two first micro-vibration motors 31 is directly determined by the length of the second shapable keel 2*b* connected between the two first micro-vibration motors 31. By designing and selecting a unit length of each of the shapable keels 2, an axial distance between the two first micro-vibration motors 31 is precisely set, thereby achieving control over a distribution density of the vibration units 3 within the elongated silicone tube 1. For example, when the two shapable keels 2 are of the same length, a uniform vibration distribution is achieved.

As shown in FIGS. 1-5, a control system 6 of the first micro-vibration motors 31 is accommodated in a rigid skull 7. The rigid skull 7 is disposed inside the head portion of the elongated silicone tube 1. A retractable neck 72 of the rigid skull 7 is connected to the head end of the first shapable keel 2*a*.

Optionally, a connecting line 8 (i.e., a conductive wire) connecting the control system 6 and the first micro-vibration motors 31 passes through inner cores of the shapable keels 2, so that the control system 6 is electrically connected to the first micro-vibration motors 31

The rigid skull 7 is located at the head portion of the elongated silicone tube 1, so as to simulate a head of the snake. A profile of the rigid skull 7 is approximately an L-shaped rigid skull, where a short section of the L-shaped rigid skull forms the retractable neck 7 and a long section accommodates the control system 6. The rigid skull 7 is connected to the two first micro-vibration motors 31 through the shapable keels 2.

Figure 5:
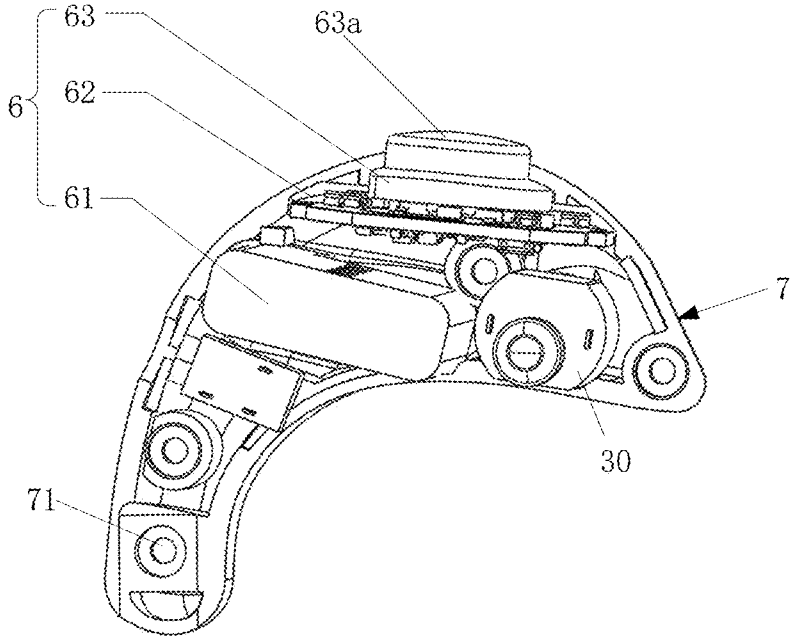
FIG. 5 is a cross-sectional schematic diagram of the rigid skull of the shapable tubular device according to the first embodiment of the present disclosure.

As shown in FIG. 5, the control system 6 comprises a power supply 61 and a control board 62. The control board 62. is a printed circuit board assembly (PCBA) control board. The power supply 61 is a storage power source, such as a lithium battery. A frequency and amplitude modulation button 63 is disposed on the control board 62, and a button cap of the frequency and amplitude modulation button 63 extends outward from a top wall of the long section of the rigid skull 7.

As shown in FIGS. 1, 2, 4, and 5, a contact surface 63*a* on a top of the button cap of the frequency and amplitude modulation button 63 is precisely aligned with an operating surface 13 of the control system 6. The operating surface 13 of the control system 6 is disposed on the head portion of the elongated silicone tube 1 and is corresponding to an upper jaw of the spinal outer surface of the extension section of the elongated silicone tube 1. The operating surface 13 of the control system 6 is configured for a user to operate.

An orthographic projection of the operating surface 13 completely covers an active area of the frequency and amplitude modulation button 63. When the finger presses the operating surface 13, a top of the head portion of the elongated silicone tube 1 produces elastic deformation, and a generated pressure is transmitted through direct contact, driving the contact surface 63*a* at the top of the button cap to move downward, thereby triggering a micro-switch mechanism disposed inside the frequency and amplitude modulation button 63. In this way, the control board 62 is turned on to modulate a frequency and an amplitude of the shapable tubular device.

Optionally, a vibration motor 30 is disposed in the head portion of the elongated silicone tube 1 and is corresponding to a lower jaw on the thoracico-abdominal outer surface of the extension section. The 31 is configured to transfer the mechanical energy to a top portion of the external object. The vibration motor 30 is a second micro-vibration motor 30 disposed in the rigid skull 7 of the elongated silicone tube 1. The second micro-vibration motor 30 generates the mechanical energy and transfers the mechanical energy to the top portion of the external object through the rigid skull 7 and the lower jaw of the head portion of the elongated silicone tube 1.

Figure 8:
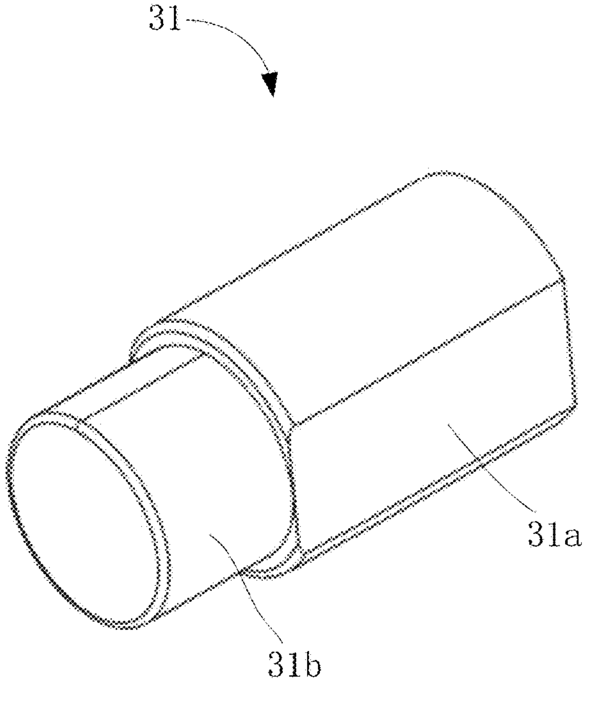
FIG. 8 is a schematic diagram of the vibration units of the shapable tubular device according to the first embodiment of the present disclosure.
Figure 9:
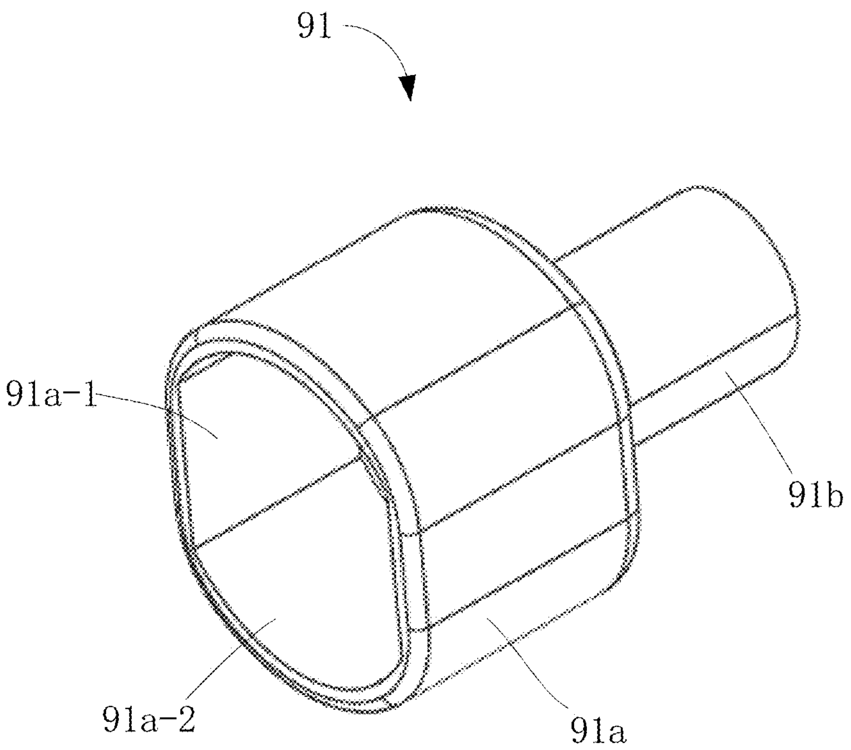
FIG. 9 is a schematic diagram of a square tube joint of the shapable tubular device according to the first embodiment of the present disclosure.
Figure 10:
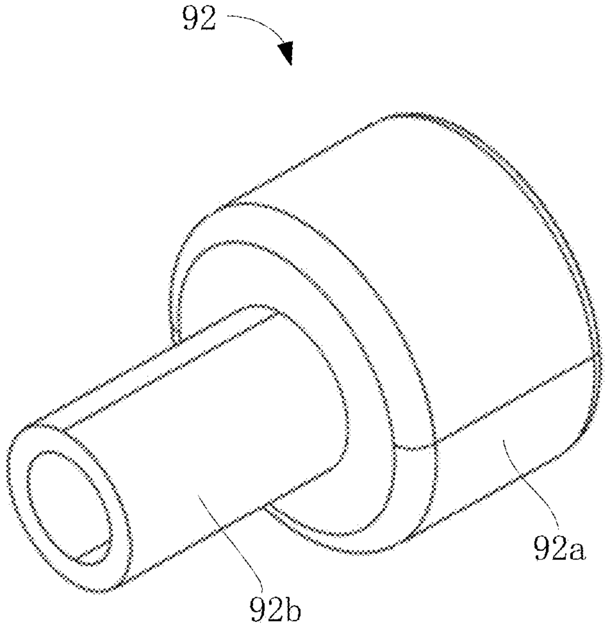
FIG. 10 is a schematic diagram of a circular tube joint of the shapable tubular device according to the first embodiment of the present disclosure.
Figure 11:
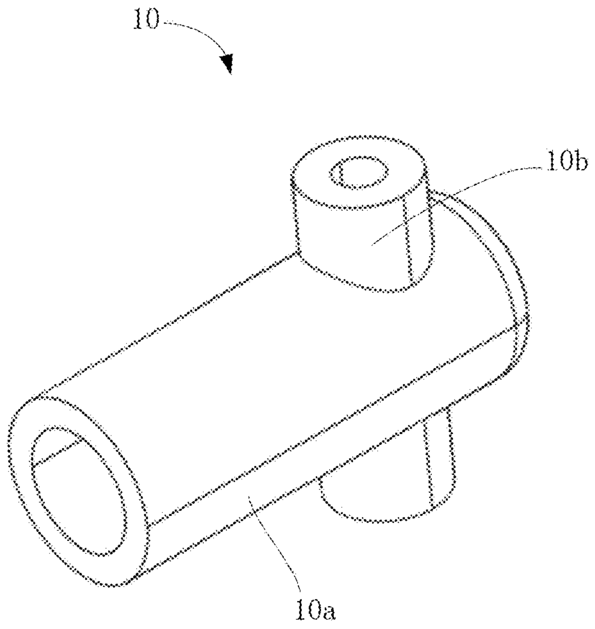
FIG. 11 is a schematic diagram of a T-shaped joint of the shapable tubular device according to the first embodiment of the present disclosure.

As shown in FIGS. 6-8, two ends of each of the first micro-vibration motors 31 are distributed along a center line of each of the first micro-vibration motors 31 and are respectively a square end 31*a* and a circular end 31*b*. The first micro-vibration motors 31 and the shapable keels are connected through sleeve structures 9. Specifically, each of the sleeve structures 9 comprises a square tube joint 91 and a circular tube joint 92. Each square tube joint 91 is connected to a corresponding one of the shapable keel and the square end 31*a* of a corresponding one of the first micro-vibration motors 31. Each circular tube joint 92 is connected to a corresponding one of the shapable keels and the circular end 31*b* of a corresponding one of the first micro-vibration motors 31.

As shown in FIGS. 6-9, each square tube joint 91 comprises a square end sleeve 91*a* and a keel tail sleeve 91*b* coaxially disposed with the square end sleeve 91*a*. Each square end sleeve 91*a* comprises two parallel inner surfaces 91*a*-1 and two arc-shaped inner surfaces 91*a*-2, the two arc-shaped inner surfaces 91*a*-2 thereof protrude outwards and are configured to separate the two parallel inner surfaces 91*a*-1 thereof, and the two parallel inner surfaces 91*a*-1 of each square end sleeve 91*a* are configured to match with two parallel outer surfaces of the square end 31*a* of a corresponding one of the first micro-vibration motors 31. The two arc-shaped inner surfaces 91*a*-2 of each square end sleeve 91*a* are configured to match with two arc-shaped outer surfaces of the square end 31*a* of the corresponding one of the first micro-vibration motors 31. Each keel tail sleeve 91*b* is sleeved on a tail end of a corresponding one of the shapable keels 2.

As shown in FIGS. 6-8 and 10, each circular tube joint 92 comprises a circular end sleeve 92*a* and a keel head sleeve 92*b* coaxially disposed with the circular end sleeve 92*a*. Each circular end sleeve 92*a* is connected to the round end of a corresponding one of the first micro-vibration motors 31, and each keel head sleeve 92*b* is sleeved on a head end of a corresponding one of the shapable keels 2.

As shown in FIGS. 5-8 and 11, a T-shaped joint 10 is disposed between the rigid skull 7 and the first shapable keel 2*a*. The connecting line 8 connecting the control system 6 and the first micro-vibration motors 31 is partially disposed inside the T-shaped joint 10. A tail end of a vertical sleeve 10*a* of the T-shaped joint 10 is sleeved with the head end of the first shapable keel 2*a*. A cross-shaped end of the T-shaped joint 10 is mounted inside the retractable neck 72 of the rigid skull 7. The cross-shaped end of the T-shaped joint 10 comprises horizontal plugs 10*b*. Through holes 71 are defined on two sides of the retractable neck 72, and the through holes 71 are coaxially disposed. The shapable tubular device further comprises screws. Each of the screws passes through a corresponding one of the through holes to screw with a corresponding one of the horizontal plugs 10*b*, so that the rigid skull 7 is fixed to the T-shaped joint 10.

The shapable tubular device provided in the embodiment defines the center line of the elongated silicone tube 1 through the shapable keels, and combined with the thoracico-abdominal outer surface 14 of the elongated silicone tube 1, the mechanical vibration energy is efficiently transmitted. The transition section is connected to the base ring, and the cross sections of the transition section gradually change in shapes and sizes, so that user discomfort caused by concentrated pressure is avoided. The control system achieves frequency and amplitude modulation control through a precisely aligned axial pressure transmission structure (i.e., the operating surface thereof and the contact surface thereof). Clinically verified, the shapable tubular device provides a good fit and meets user comfort requirements.

Embodiment 2

Figure 12:
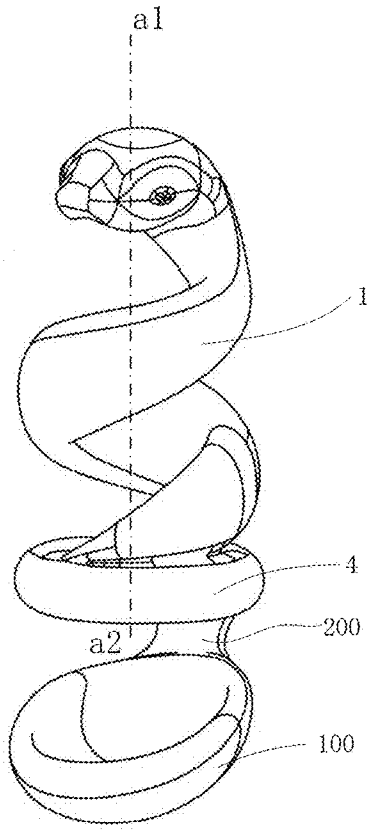
FIG. 12 is a schematic diagram of the shapable tubular device in a spiral shape according to a second embodiment of the present disclosure.
Figure 13:
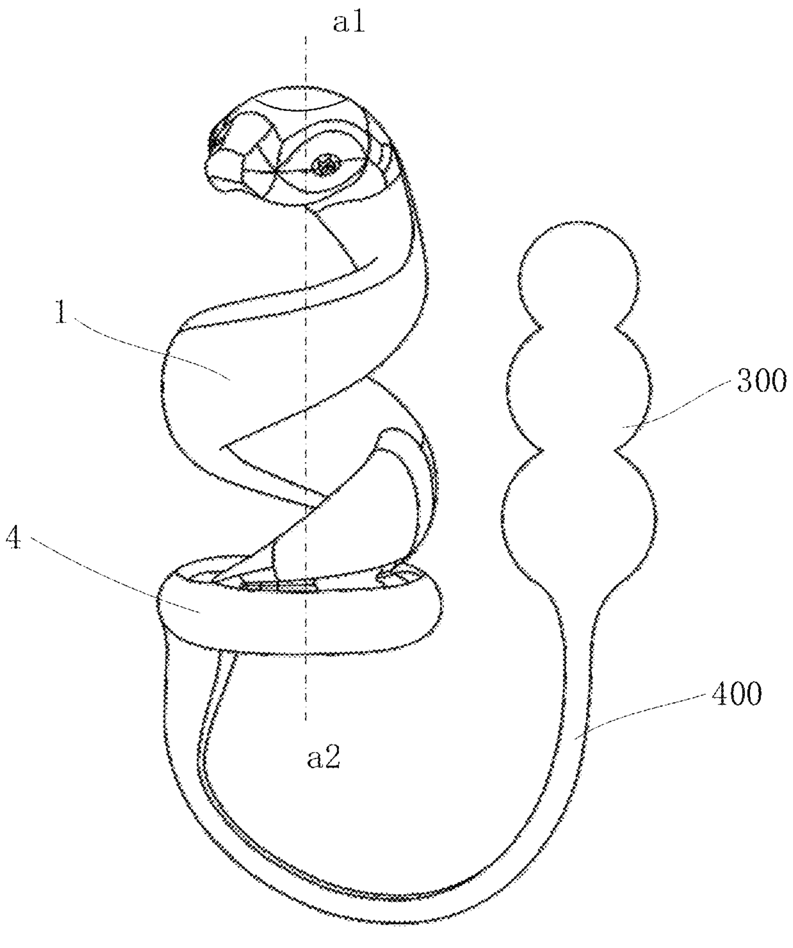
FIG. 13 is a schematic diagram of the shapable tubular device in a spiral shape according to a third embodiment of the present disclosure.

As shown in FIG. 12, a difference between embodiment 2 and embodiment 1 is that the shapeable tubular device further comprises a micro-vibration device 100. The micro-vibration device 100 is connected to a lower end of base ring 4 through a flexible connector 200. The micro-vibration device 100 is configured to massage the scrotum of adult men. In the embodiment, the micro-vibration device 100 is the same as a micro-vibration device in the prior art, and a specific structure thereof is not further described herein.

Embodiment 3

As shown in FIG. 12, a difference between embodiment 3 and embodiment 1 is that the shapeable tubular device further comprises beads 200. The beads 300 are connected to the lower end of base ring 4 through a flexible line 400. The beads 300 are configured to massage the anus, rectal sphincter or prostate area of the adult men. In the embodiment, the beads 300 are the same as beads in the prior art, and a specific structure thereof is not further described herein.

The above description is only optional embodiments of the present disclosure and is not intended to limit the present disclosure. Any modifications, equivalent substitutions, improvements, etc. made within the spirit and principles of the present disclosure should be included in the protection scope of the present disclosure.

What is claimed is:

1. A shapable tubular device configured to transfer mechanical energy, comprising:

an elongated silicone tube;

shapable keels disposed inside the elongated silicone tube along an extension direction of the elongated silicone tube; and vibration units disposed inside the elongated silicone tube along the extension direction of the elongated silicone tube;

wherein the elongated silicone tube is closed at two ends thereof, and a portion of an outer surface of the elongated silicone tube is configured to transfer the mechanical energy of the shapable tubular device to an external object;

wherein the shapable keels are configured to deform the elongated silicone tube during operation, so that a portion of the outer surface of the elongated silicone tube is adapted to a contour of the external object;

wherein the vibration units are configured to transmit the mechanical energy generated during operation to the elongated silicone tube from inside to outside;

wherein a vibration motor is disposed in a head portion of the elongated silicone tube and corresponds to a lower jaw on a thoracico-abdominal outer surface of an extension section, and the vibration motor is configured to transfer the mechanical energy to a top portion of the external object;

wherein a control system of the vibration units is accommodated in a rigid skull, and the rigid skull is disposed inside the head portion of the elongated silicone tube;

wherein a retractable neck of the rigid skull is connected to a head end of a top shapable keel of the shapable keels.

2. The shapable tubular device according to claim 1, wherein the shapable keels and the vibration units are alternately disposed along the extension direction of the elongated silicone tube to improve an overall shapeability of the elongated silicone tube and ensure uniformity of vibration distribution.

3. The shapable tubular device according to claim 1, wherein an operating surface of the control system is disposed on the head portion of the elongated silicone tube and is corresponding to an upper jaw of a spinal outer surface of the extension section of the elongated silicone tube, and the operating surface of the control system is configured for a user to operate.

4. The shapable tubular device according to claim 3, wherein a connecting line of the control system and the vibration units passes through inner cores of the shapable keels.

5. The shapable tubular device according to claim 4, wherein two ends of each of the vibration units distributed along a center line of each of the vibration units are respectively a square end and a circular end.

6. The shapable tubular device according to claim 5, wherein the vibration units and the shapable keels are connected through sleeve structures.

7. The shapable tubular device according to claim 6, wherein each of the sleeve structures comprises a square tube joint and a circular tube joint, wherein each square tube joint is connected to a corresponding one of the shapable keels and the square end of a corresponding one of the vibration units;

wherein each circular tube joint is connected to a corresponding one of the shapable keels and the circular end of a corresponding one of the vibration units.

8. The shapable tubular device according to claim 7, wherein each square tube joint comprises a square end sleeve and a keel tail sleeve coaxially disposed with the square end sleeve;

wherein each square end sleeve comprises two parallel inner surfaces and two arc-shaped inner surfaces, and the two arc-shaped inner surfaces thereof protrude outwards and are configured to separate the two parallel inner surfaces thereof;

wherein the two parallel inner surfaces of each square end sleeve are configured to match with two parallel outer surfaces of the square end of a corresponding one of the vibration units, and the two arc-shaped inner surfaces of each square end sleeve are configured to match with two arc-shaped outer surfaces of the square end of the corresponding one of the vibration units;

wherein each keel tail sleeve is sleeved on a tail end of a corresponding one of the shapable keels.

9. The shapable tubular device according to claim 8, wherein each circular tube joint comprises a circular end sleeve and a keel head sleeve coaxially disposed with the circular end sleeve;

wherein each circular end sleeve is connected to a round end of a corresponding one of the vibration units, and each keel head sleeve is sleeved on a head end of a corresponding one of the shapable keels.

10. The shapable tubular device according to claim 9, wherein a T-shaped joint is disposed between the rigid skull and the top shapable keel, and the connecting line connecting the control system and the vibration units is partially disposed inside the T-shaped joint.

11. The shapable tubular device according to claim 10, wherein a tail end of a vertical sleeve of the T-shaped joint is sleeved with the head end of the top shapable keel, a cross-shaped end of the T-shaped joint is mounted inside the retractable neck of the rigid skull, and the cross-shaped end of the T-shaped joint comprises horizontal plugs.

12. The shapable tubular device according to claim 11, wherein through holes are defined on two sides of the retractable neck, and the through holes are coaxially disposed;

wherein the shapable tubular device further comprises screws, and each of the screws passes through a corresponding one of the through holes to screw with a corresponding one of the horizontal plugs.

13. A shapable tubular device configured to transfer mechanical energy, comprising:

an elongated silicone tube;

shapable keels disposed inside the elongated silicone tube along an extension direction of the elongated silicone tube; and vibration units disposed inside the elongated silicone tube along the extension direction of the elongated silicone tube;

wherein the elongated silicone tube is closed at two ends thereof, and a portion of an outer surface of the elongated silicone tube is configured to transfer the mechanical energy of the shapable tubular device to an external object;

wherein the shapable keels are configured to deform the elongated silicone tube during operation, so that a portion of the outer surface of the elongated silicone tube is adapted to a contour of the external object;

wherein the vibration units are configured to transmit the mechanical energy generated during operation to the elongated silicone tube from inside to outside;

wherein a tail portion of the elongated silicone tube is coiled into a base ring, and the base ring is configured to be sleeved on a root of an external object;

wherein the elongated silicone tube comprises an extension section extending from the tail portion thereof to a head portion thereof, a thoracico-abdominal outer surface of the extension section is longitudinally contractible and bent, a spinal outer surface of the extension section is longitudinally expandable and bent, and the extension section is capable of being spirally wound on the external object;

wherein a center line of the extension section is substantially coincident with a center line of the base ring, so that the thoracico-abdominal outer surface of the extension section is in an approximate cylindrical shape to adapt to the external object, and the thoracico-abdominal outer surface of the extension section is configured to transfer the mechanical energy to a cylindrical surface of the external object.

14. The shapable tubular device according to claim 13, wherein a transition section is connected between the base ring and the extension section extending toward the head portion of the elongated silicone tube, shapes and sizes of cross sections of the transition section gradually change.

15. The shapable tubular device according to claim 14, wherein the cross sections of the transition section comprise a circular cross section connected to the base ring and a flat ring-shaped cross section connected to the extension section.

16. A shapable tubular device configured to transfer mechanical energy, comprising:

an elongated silicone tube;

shapable keels disposed inside the elongated silicone tube along an extension direction of the elongated silicone tube; and vibration units disposed inside the elongated silicone tube along the extension direction of the elongated silicone tube;

wherein the elongated silicone tube is closed at two ends thereof, and a portion of an outer surface of the elongated silicone tube is configured to transfer the mechanical energy of the shapable tubular device to an external object;

wherein the shapable keels are configured to deform the elongated silicone tube during operation, so that a portion of the outer surface of the elongated silicone tube is adapted to a contour of the external object;

wherein the vibration units are configured to transmit the mechanical energy generated during operation to the elongated silicone tube from inside to outside;

wherein positioning grooves configured to accommodate the vibration units are defined on an inner wall of the elongated silicone tube, and the positioning grooves are configured to prevent the vibration units from moving and prevent the vibration units from longitudinally squeezing the shapable keels.

17. The shapable tubular device according to claim 16, wherein a deformation space is defined between outer walls of the shapable keels and the inner wall of the elongated silicone tube, and the deformation space allows the shapable tubular device to be in a working state or in a storage state.

* * * * *